INVENTOR
JAMES V. BALL
ATTORNEY

United States Patent Office 3,465,230
Patented Sept. 2, 1969

3,465,230
THERMAL RESPONSIVE RECHARGE PROTECTION DEVICE TO PROVIDE TWO LEVEL CHARGING
James V. Ball, Lowell, Mass., assignors to P. R. Mallory & Co. Inc., Indianapolis, Ind., a corporation of Delaware
Filed Jan. 9, 1967, Ser. No. 607,959
Int. Cl. H02j 7/00; H01m 45/04
U.S. Cl. 320—17                 14 Claims

ABSTRACT OF THE DISCLOSURE

The present invention relates generally to means and methods for allowing electrical energy to flow from a source of electrical energy to a rechargeable multiple cell battery. More particularly, the present invention relates to a means and method which provides recharging of a multiple cell battery at a fast recharging rate and when one cell of the multiple cell battery reaches its fully recharged state, the fast recharge rate for the entire multiple cell battery is reduced to the safe continuous overcharge rate without the necessity of requiring operator assistance.

In general, recharging of a multiple cell battery is accomplished by reconstituting the electrodes of the individual cell using a safe, continuous overcharge rate which will not damage the electrodes of the cell and/or cause excessive pressure to build up in a cell which is hermetically sealed. For example, nickel-cadmium cells have an accepted maximum continuous overcharge rate of about $C/10$, where C is the ampere hour capacity of the nickel-cadmium cell at a five hour rate. Other cells fabricated from different materials have different maximum continuous overcharge rates. For example, silver-cadmium cells have a maximum continuous overcharge rate of $C/100$. Recharging the battery at the accepted maximum overcharge rate or "trickle charging" establishes an equilibrium condition wherein the rate of evolution of oxygen at one electrode of the cell is equal to the rate of reduction of the evolved oxygen at the other electrode of the cell. Using the accepted maximum continuous overcharge rate to reconstitute the electrodes of the secondary cell requires from 14 to 16 hours since the process of reconstitution of the electrodes is less than 100 per cent efficient in actual practice due to heat losses, gas evolution and other reactions. However, nickel-cadmium secondary cells can accept a fast recharge rate of $C/1$ which rate requires about 1 to 2 hours to reconstitute the electrodes of the cell without damage thereto assuming the fast recharge rate is terminated when the cell reaches its fully recharged state. Since the $C/1$ recharge rate exceeds the safe maximum overcharge rate by a factor of 10, the cell upon attaining a fully recharged state will thereafter evolve oxygen at one electrode at a faster rate than the oxygen is reduced at the other electrode thereby damaging the electrodes due to the harmful heat produced. In addition, the accumulation of oxygen within the secondary cell causes the internal pressure to increase significantly assuming the cell is hermetically sealed. Therefore, it is seen that the secondary cell may be recharged at the fast recharge rate of $C/1$ until such time as the electrodes of the cell are fully reconstituted. Continued recharge at the $C/1$ fast recharge rate after the cell reaches a fully recharged state damages the cell. It has been found that the operator of fast recharge devices cannot be relied upon to manually terminate the fast recharge cycle when appropriate, therefore, several of the prior art recharge devices reconstitute the electrodes of the secondary cell at the slower and safe accepted maximum continuous overcharge rate.

It is seen that a need exists for an automatic multiple cell battery recharge means which allows the battery to be recharged at the faster charge rate, such as for example, the $C/1$ for nickel-cadmium cells, and when the battery attains its fully recharged state, the fast recharging rate is automatically reduced to the accepted maximum continuous overcharge rate or "trickle" charge rate without the necessity of operator assistance. This the present invention does.

The present invention provides a voltage sensitive means for automatically reducing the fast charge current to a "trickle" charge rate when one cell of a multiple cell battery reaches a predetermined voltage level. A semiconductor and heat sink cooperate so as to allow the semiconductor to take advantage of its negative temperature coefficient of voltage. The combination of the semiconductor and the heat sink provides a means having forward current-voltage characteristics similar to the reverse current-voltage characteristic of a Zener diode or of an avalanche diode. The combination of the heat sink and semiconductor means allows the semiconductor to shunt progressively largely values of recharging current around the cooperatively associated cell than otherwise would be possible when the cell attains a predetermined voltage. A thermal sensitive switch means such as a bimetal snap switch means or the like is thermally connected to the heat sink so that when the heat sink reaches a predetermined temperature due to current flowing through the semiconductor, the thermal sensitive switch means is actuated so as to cause the recharging current to flow through resistance means which drops the recharging current to the maximum continuous overcharge rate.

Therefore, it is an object of the present invention to provide a multiple cell battery recharge protection means wherein one voltage sensing device is used to protect the battery from deleterious overcharge.

A further object of the present invention is to provide a multiple cell battery recharge protection means wherein recharge of unmatched cells is accomplished without subjecting any one of said unmatched cells to a detrimental overcharge current.

Another object of the present invention is to provide a multiple cell battery recharge protection means wherein unmatched cells are recharged in such a manner so that the possible occurrence of individual cell reversal during discharge is substantially eliminated.

Still another object of the present invention is to provide a multiple cell battery recharge protection means wherein the protection means is substantially free from the effects of ambient temperature and line voltage variations.

A further object of the present invention is to provide a multiple cell battery recharge protection means that substantially terminates the flow of the fast recharge current through the multiple cell battery when a secondary cell thereof reaches a fully recharged condition.

Another object of the present invention is to provide a multiple cell battery recharge protection means that allows only the accepted maximum continuous overcharge current to flow through the individual secondary cells when one cell thereof attains a predetermined recharge voltage.

A further object of the present invention is to provide a multiple cell battery recharge protection means that reconstitutes the electrodes of a discharged secondary cell in about 1 to 2 hours or less.

Yet another object of the present invention is to provide a multiple cell battery recharge protection means that includes heat sink means and thermal switch means thermally connected thereto, the thermal switch connecting resistance means into the recharging circuit so as to reduce the value of the recharging current when the heat sink attains a predetermined temperature.

A further object of the present invention is to provide a multiple cell battery recharge protection means providing a fast recharge of a multiple cell battery used in industrial and consumer products.

Yet another object of the present invention is to provide a multiple cell battery recharge protection means that automatically protects one secondary cell from harmfull overcharge regardless of the previous state of charge of the cell or of any particular secondary cell of a plurality of serially coupled secondary cells.

Still another object of the present invention is to provide a multiple cell battery recharge protection means that is efficient and accurate in operation.

A further object of the present invention is to provide a multiple cell battery recharge protection means that is characterized by its simplicity of construction.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings. The invention resides in the novel construction, combination, arrangement and cooperation of elements as hereinafter described and more particularly as defined in the appended claims.

The appended drawings illustrate an embodiment of the present invention constructed to function in the most advantageous modes devised for the practical application of the basic principals involved in the hereinafter described invention.

Generally speaking, the means and methods of the present invention relate to a multiple cell battery recharge protection means. The multiple cell battery recharge protection means includes a thermal sensitive switch means having one side connected to the source of electrical energy so that a fast charge current flows therethrough. Resistance means cooperates with the thermal switch means and reduces the fast charge current to a "trickle" charge when a first one of the serially connected cells reaches a predetermined voltage value. The other side of the thermal sensitive switch means is connected to a semiconductor means through a leg of the resistance means to a first one of the secondary cells. The other of the secondary cells are connected across the leg of said resistance means. The semiconductor means is connected across the first cell causing the fast charge current to flow through the first one of the cells until the cell reaches a predetermined voltage value. The leg of the resistance means causes a lesser value of fast charge current to flow through the other secondary cells. The predetermined voltage value of the first cell biases the semiconductor means to conduction so as to shunt substantially all of the fast charge current around the first cell. Suitable means thermally connect the semiconductor means to the thermal sensitive switch so that as the semiconductor means generates heat due to the fast charge current flowing therethrough, the heat causes the thermal sensitive switch to open causing the current of the source to flow through the resistance means thereby reducing the fast charge current to a "trickle" charge which flows through the secondary cells and allowing the semiconductor means to be biased to nonconduction.

Figure 1:
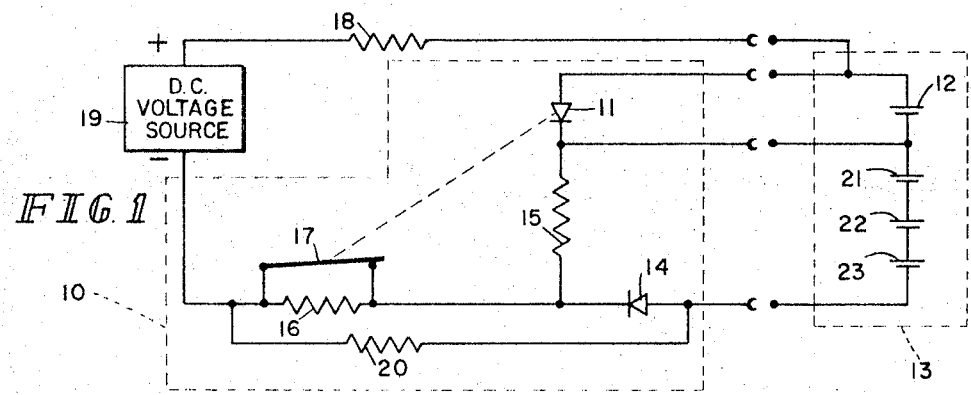
FIGURE 1 is an electrical schematic of the present invention illustrating the multiple cell battery recharge protection means connected to a battery composed of serially connected secondary cells.

Referring now to FIGURE 1 of the drawings, the multiple cell battery recharge protection means is generally indicated by numeral 10. The recharge protection means includes a specially fabricated diode 11. The diode 11 is a special type of diode which makes use of its forward conduction characteristics. Assuming that the fully recharged state of an individual cell of the battery is approximately 1.5 volts, Zener diodes cannot be used satisfactorily since the lowest Zener voltage of presently available Zener diodes is about 2.6 volts. The diode 11 is a specially fabricated diode which makes use of the fact that various semiconductive materials have different gating voltage levels. For example, a silicon wafer has a gating voltage of about 0.6 volt, germanium wafer about 0.4 volt, and galluim arsenid about 1.1 volts. It is seen that the gating voltage levels of individual wafers are to low for battery charging utilization. However, two or more individual wafers may be suitably connected together so as to form a unitary diode that has a gating voltage characteristic that is the sum of the gating voltage characteristics of the individual wafers. Thus, a series combination of a germanium wafer and a gallium arsenide wafer will have a gating voltage level that approximates about 1.5 volts. The gating voltage of the combined wafers approaches the fully recharged condition of the individual secondary cell. As shown in FIGURE 1, the diode 11 is connected across secondary cell 12 of a multiple secondary cell battery 13. It is seen that the cathode of the diode is connected to the negative electrode of the cell and the anode of the diode is connected to the positive terminal of the secondary cell 12 through current limiting resistor 18.

The cathode of diode 11 is connected to the cathode of diode 14 through resistor 15 which is a leg of a resistance means comprising resistors 15, 16 and 20. The anode of diode 14 is connected to the negative terminal of the multiple cell battery 13. The cathode of diode 14 is connected to one side of resistor 16 and to one side of thermal sensitive switch means 17. The diode 14 prevents cells 21, 22 and 23 from discharging through resistor 15 and is back-biased when the fast charge current is reduced to the "trickle" charge upon the opening of the thermal switch so as to substantially prevent current flow therethrough.

FIGURE 1 shows that resistor 16 is connected across the thermal switch means 17. The other side of the thermal switch and the other side of the resistor 16 are connected to the negative side of the direct current voltage source 19. The resistor 16 is thermally connected to the thermal switch means 17 by any suitable thermally conductive conduit means (not shown) such as a strip of copper, aluminum or the like so that when the thermal switch means is biased opened, current flowing through the resistor is sufficient to cause the resistor to heat and hence maintain the thermal switch in an open position.

The diode 11 includes a heat sink means (not shown) thermally connected to the thermal switch through any suitable conduit means such as a strip of metal such as copper and the like. It is seen that when the heat sink of diode experiences a temperature rise, the change in temperature is transmitted to the thermal sensitive switch through the conduit means. If the temperature of the diode 11 and hence the heat sink reaches and/or surpasses a predetermined temperature, the thermal sensitive switch means is biased to an open position placing resistors 15 and 16 in series with cell 12 and cells 21, 22 and 23 in series with resistor 20 thereby reducing the amount of current flowing in the multiple cell battery recharge device to the accepted maximum continuous overcharge current.

It is seen that resistor 20 is connected to the anode of diode 14 and to the other side of resistor 16 and to the other side of the thermal switch means.

The positive side of the direct current voltage source is connected to the anode of diode 11 as indicated in FIGURE 1. The direct current voltage source may be separated from or connected to the multiple cell battery recharge device by any suitable means such as on an electrical plug and jack means (not shown) which facilitates connection to and removal of the voltage source from the aforementioned structural elements.

With the hereinbefore structural disclosure in mind and by continued reference to the several figures of the drawing, the following analysis of the operation of the present invention will further serve to amplify the novelty of the present invention.

Figure 2:
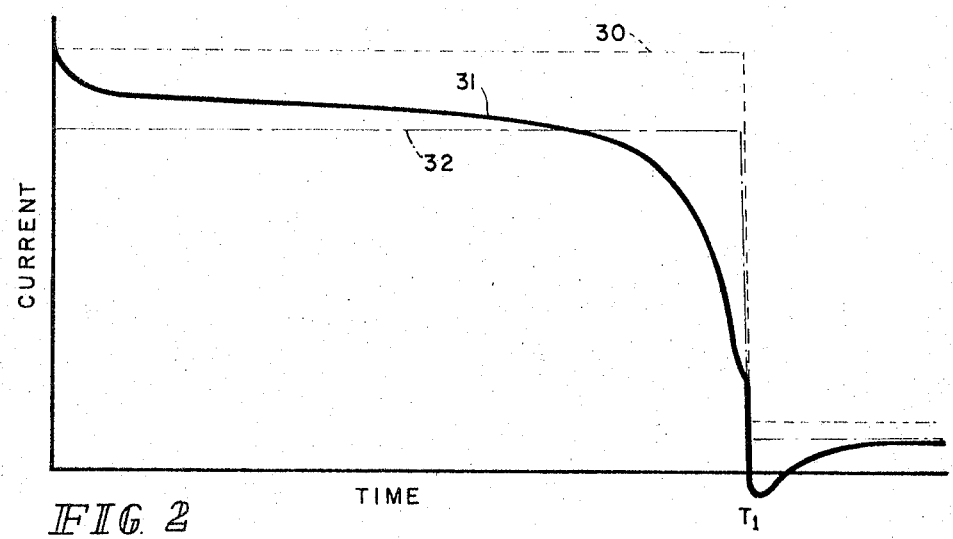
FIGURE 2 is a graphic illustration of the total recharge current, the recharge current flowing into one cell of the multiple cell battery, and the recharge current flowing into the remaining cells of the multiple cell battery during fast charging and "trickle" charging of the battery.
Figure 3:
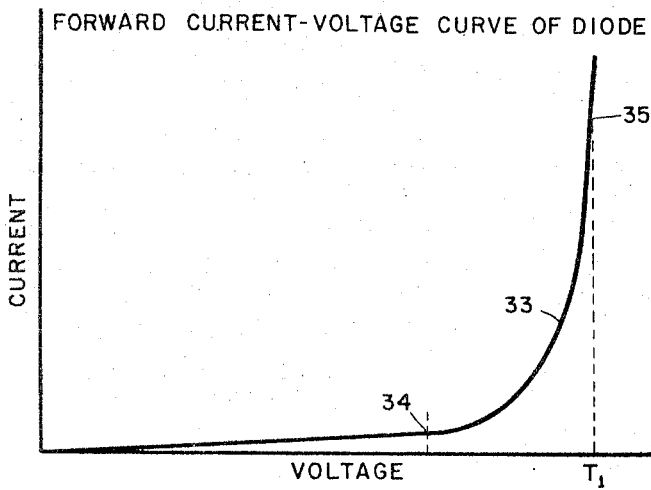
FIGURE 3 is a graphic showing of the forward current-voltage characteristics of the semiconductor device used in the present invention.

The principal operation of the multiple cell battery recharge device can best be understood by referring to FIGURES 1 to 3 of the drawing. Assuming that the individual cells of the multiple cell battery are discharged, fast charging current passes through the current limiting resistor 18 and the thermal switch 17 to the battery 13 to thereby recharge the individual cells of the battery. During the fast recharge period, the thermal switch means is closed as shown by the solid line of FIGURE 1. The major portion of the total recharge current passes through the serially connected cells of the battery. It is seen that a portion of the total recharge current is shunted around secondary cells 21, 22 and 23 by the resistor 15 and around secondary cell 12 due to the small amount of leakage current normally associated with diode 11.

FIGURE 2 shows three separate and distinct current curves indicative of the several values of current flowing into the cells of the battery during the fast recharge period. The dotted line curve 30 illustrates the total current flowing in the circuit during the fast recharge period and the total current flowing value in the circuit after the thermal switch is opened at the time $T_1$. The solid line curve 31 shows the recharge current value flowing through the secondary cell 12 at all times prior to and subsequent to the opening of the thermal switch at $T_1$. The dashed line curve 32 illustrates the relative magnitude of recharge current flowing in cells 21, 22 and 23 when compared to the relative magnitude of the other current values prior to and subsequent to the opening of the thermal switch at $T_1$.

As illustrated in FIGURE 2, the total recharge current curve 30 is relatively constant during recharging of the battery. The value of the total recharge current flowing in the circuit is governed by the resistive value of current limiting resistor 18 and the magnitude of the voltage of the voltage source 19. Assuming that the magnitude of the voltage of source 19 remains substantially constant, the resistive value of the current limiting resistor controls the value of the total recharge current present to recharge the secondary cells.

As illustrated in FIGURE 2 by recharge current curve 31, the recharge current applied to cell 12 initially approximates the total current at the beginning of the recharge cycle. Thereafter, recharge current curve 31 slopes rather abruptly for a period of time and then slopes rather gently for another period of time. Near the end of the fast recharge cycle of cell 12, the recharge current curve 31 again slopes rather abruptly. The magnitude of the recharge current curve flowing through the cell 12 at any instant of time during the recharge cycle is largely determined by the forward current-voltage characteristic of diode 11, that is, the total current flowing in the circuit less the amount of current that is shunted around cell 12 by the diode 11. The forward current-voltage characteristic of diode 11 is illustrated in FIGURE 3.

Recharge current curve 32 as illustrated in FIGURE 2 is indicative of the recharge current used to recharge cells 21, 22 and 23. It will be noted that the value of the fast recharge current flowing into cells 21, 22 and 23 is the total current less the amount of current flowing through resistor 15. Due to the substantially constant voltage of cells 21, 22 and 23, the average current through resistor 15 is also constant. It is seen that cells 21, 22 and 23 are recharged by a current value that is less than the current flowing from the direct current source.

Forward current-voltage curve 33 shown in FIGURE 3 illustrates the current-voltage characteristic of diode 11. Point 34 on the curve indicates the substantially fully charged state of secondary cell 21. It is to be noted that the diode 11 conducts little current during the early stages of the high recharge rate to which cell 12 is subjected thereby indicating that nearly all of the total recharge current is flowing into cell 12. However, as the cell voltage of cell 12 rises, the diode 11 conducts progressively more current due to the increased cell voltage moving the conduction point of diode 11 to point 35 on the diode current-voltage characteristic curve 33. The increased conduction of the diode 11 causes the junctions thereof to heat. The generation of heat by the junctions of the diode indicates that the cell 12 is fully recharged. Transmitting the heat generated by the junctions of the diode 11 to the thermal sensitive switch means 17 via a heat sink means not only prevents possible damage to the junctions of diode by heat, but is used to indicate the fully recharged condition of cell 12. The heat generated, thus being an indication of the end-of-charge of the secondary cell 12, operates the thermal sensitive switch means to an open position thereby connecting resistors 15 and 16 in series with the voltage source through cell 12 and resistor 20 in series with the voltage source through the cells of the battery thereby reducing the magnitude of the fast charge current to a "trickle" charge.

If the resistance value of resistor 16 is chosen properly, the resistor will pass sufficient current to compensate for the forward leakage current of diode 11. Therefore, the multiple cell battery may be considered to be open circuited after the thermal switch has opened. The heat generated by the current flowing through resistor 16 is sufficient to maintain the thermal switch open.

Because of relatively high resistive value and the relative low value of voltage across the resistor when the thermal switch is closed, resistor 16 does not materially alter the magnitude of the fast charge current during the fast charge cycle.

The current flowing through resistor 15 to the cathode of diode 14 is sufficient to bias diode 14 to nonconduction. Therefore, resistor 20 connected in the circuit as shown in FIGURE 1 determines the value of the "trickle" recharge current flowing through cells 12, 21, 22 and 23. If resistor 16 is chosen to provide diode 11 leakage current, then the battery can be considered open circuited and resistor 20 will provide "trickle" charge current for the entire battery.

It should be noted that the charge current flowing into the secondary cells during the fast charge cycle is the area under the current-time curve illustrated in FIGURE 2. FIGURE 2 illustrates the amp-hours flowing into the individual secondary cells. To assure that substantially equal amounts of amp-hours flow into each cell, it is necessary to ensure that the areas under the curves 31 and 32 are substantially equal. The resistance value of resistor 15, if chosen properly, will assure that the areas under the curves 31 and 32 are substantially equal when the thermal sensitive switch opens at time $T_1$. Therefore, the individual cells of the battery should be at substantially the same voltage level when the thermal switch opens. However, to allow for minor changes in capacity of the cell during its lifetime, the resistive value of resistor 15 may be selected so that only about 90% or less of the charge inserted into cell 12 is inserted into cells 21, 22 and 23. The remainder of the charge necessary to bring cells 21, 22 and 23 to the fully recharged state would flow into cells 21, 22 and 23 during a determined length of time after the thermal switch has opened.

Recharging cells, 21, 22 and 23 at a rate less than the recharge rate of cell 12 allows the circuitry of FIGURE 1 to be used for recharging cells that have different capacities without subjecting the individual cells to the possibility of cell reversal during subsequent discharge. Assuming that each cell has a capacity within 20 percent of each other, the resistive value of resistor 15 is chosen so that cells 21, 22 and 23 receive only 80 percent of the charge received by cell 12. It is seen that none of the individual cells are overcharged as long as the individual cells capacity is within 20 percent of each other.

It is seen that if resistor 20 is omitted of the circuit of FIGURE 1 thereby preventing the "trickle" charge from flowing into cells 12, 21, 22 and 23, these cells will not be "trickle" charged, however, cells 21, 22 and 23 will receive substantially the same charge during the fast recharge so that during a subsequent discharge cycle, cells 21, 22 and 23 will be discharged at substantially the same instant of time thereby substantially reducing the possibility of cell reversal.

While the invention is illustrated and described in embodiments, it will be understood that modifications and variations may be effected without departing from the scope of the novel concepts of this invention and as set forth in the appended claims.

Having thus described my invention, I claim:

1. In combination, a source of electrical energy and multiple cell battery recharge protection means connected in series for charging serially connected secondary cells, said multiple cell battery recharge protection means comprising thermal sensitive switch means having one side connected to said source of electrical energy so that a first charge current flows therethrough, resistance means cooperatively associated with said thermal sensitive switch means for reducing said fast charge current to a safe overcharge current when said thermal sensitive switch is opened, the other side of said thermal sensitive switch means connected to semiconductor means and to a first one of said secondary cells through a leg of said resistance means, the other of said secondary cells connected across said leg of said resistance means, said semiconductor means connected across said first cell causing said fast charge current to flow through said first one of said secondary cells until said cell reaches said predetermined voltage level, said leg of said resistance means causing a lesser value fast charge current to flow through said other secondary cells, said predetermined voltage level of said first cell biasing said semiconductor means to conduction so as to shunt substantially all of said fast charge current around said first cell, and means thermally connecting said semiconductor means to said thermal sensitive switch, said semiconductor means generating heat as said fast charge current flows therethrough, said heat causes said thermal sensitive switch means to open causing said current to flow through said resistance means thereby reducing said fast charge current to safe overcharge current flowing through all of said secondary cells.

2. In combination, a source of electrical energy and multiple cell battery recharge protection means connected in series for charging serially connected secondary cells as claimed in claim 1, wherein said resistance means includes said leg connected across said other cells of said battery, a resistor connected across said thermal switch and a resistor connected between the negative terminal of said battery and the negative terminal of said source of electrical energy.

3. In combination, a source of electrical energy and multiple cell battery recharge protection means connected in series for charging serially connected secondary cells as claimed in claim 1, including a diode means connected between the negative terminal of said battery and said leg of said resistance means for preventing said other cells from discharging through said leg of said resistance means.

4. In combination, a source of electrical energy and multiple cell battery recharge protection means connected in series for charging serially connected secondary cells as claimed in claim 1, wherein said semiconductor means is a diode connected across said first secondary cell.

5. In combination, a source of electrical energy and multiple cell battery recharge protection means connected in series for charging serially connected secondary cells as claimed in claim 1, wherein said resistance means is thermally connected to said thermal sensitive switch so that heat generated by said current flowing through said resistance means maintains said switch means in an open position after said switch is opened.

6. In combination, a source of electrical energy and multiple cell battery recharge protection means connected in series for charging serially connected secondary cells as claimed in claim 1, wherein said semiconduction means is biased to conduction when said first secondary cell attains a voltage level of about 1.5 volts.

7. In combination, a source of electrical energy and multiple cell battery recharge protection means connected in series for charging serially connected secondary cells as claimed in claim 1, wherein said semiconductor means is biased to nonconduction when said thermal sensitive switch means is opened.

8. In combination, a source of electrical energy and multiple cell battery recharge protection means connected in series for charging serially connected secondary cells as claimed in claim 1, wherein said semiconductor means is a diode having its anode connected to the positive terminal of said first cell and its cathode connected to the negative terminal of said first cell.

9. In combination, a source of electrical energy and multiple cell battery recharge protection means connected in series for charging serially connected secondary cells, said multiple cell battery recharge protection means comprising thermal sensitive switch means having one side connected to said source of electrical energy so that a fast charge flows therethrough, resistance means cooperatively associated with said thermal sensitive switch means for reducing said fast charge current to a safe overcharge current when said thermal sensitive switch is opened, the other side of said thermal sensitive switch means connected to voltage sensitive means and to a first one of said secondary cells through a leg of said resistance means, the other of said secondary cells connected across said leg of said resistance means, said voltage sensitive means connected across said first cell causing said fast charge current to flow through said first one of said secondary cells until said cell reaches said predetermined voltage level, said leg of said resistance means causing a lesser value fast charge current to flow through said other secondary cells, said predetermined voltage level of said first cell biasing said voltage sensitive means to conduction so as to shunt substantially all of said fast charge current around said first cell, and means thermally connecting said voltage sensitive means to said thermal sensitive switch, said voltage sensitive means generating heat as said fast charge current flows therethrough, said heat causes said thermal sensitive switch means to open causing said current to flow through said resistance means thereby reducing said fast charge current to a safe overcharge current flowing through all of said secondary cells.

10. In combination, a source of electrical energy and multiple cell battery recharge protection means connected in series for charging serially connected secondary cells as claimed in claim 9, wherein said resistance means includes said leg connected across said other cells of said battery, a resistor connected across said thermal switch and a resistor connected between the negative terminal of said battery and the negative terminal of said source of electrical energy.

11. A recharge means comprising thermal sensitive means having first and second states and having one side connected to a source of electrical energy so that a fast charge current flows therethrough when in said first state, current reducing means cooperatively associated with said thermal sensitive switch means for reducing said fast charge current to a safe overcharge current when said thermal sensitive means is in said second state, semiconductor means connected across at least one cell in a plurality of serially connected secondary cells to be recharged and said current reducing means including current resistive means connected across the remaining secondary cells, the other side of said thermal sensitive means connected to said source of electrical energy through said semiconductor means, said semiconductor means directing said fast charge current flow through said secondary cell means, and means thermally connecting said semiconductor means to said thermal sensitive means, said semiconductor means generating heat as said fast charge current flows therethrough, said heat actuates said thermal sensitive means to assume said second state causing said current to flow through said current reducing means thereby reducing said fast charge current to a safe overcharge current flowing through said secondary cell means.

12. The recharge means of claim 11, wherein said semiconductor means is a diode means, said thermal sensitive means is a thermal sensitive switch and said means cooperatively associated with said thermal sensitive switch is a resistor.

13. The recharge means of claim 12, wherein said means thermally connecting said diode means to said thermal switch is a copper strip.

14. The recharge means of claim 13, further including another diode connected between said serially connected cells and said other resistor for substantially preventing said cells from discharging through said other resistor when said fast charging current is reduced to said safe overcharge current.

References Cited

UNITED STATES PATENTS 3,113,255  12/1963  Eberts _____ 320—36

LEE T. HIX, Primary Examiner

STANLEY WEINBERG, Assistant Examiner

U.S. Cl. X.R.

320—20, 23, 35, 39